United States Patent
Ikeuchi

(10) Patent No.: US 10,062,919 B2
(45) Date of Patent: Aug. 28, 2018

(54) REDOX FLOW BATTERY

(71) Applicant: Sumitomo Electric Industries, Ltd., Osaka-shi (JP)

(72) Inventor: Atsuo Ikeuchi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 16 days.

(21) Appl. No.: 15/307,238

(22) PCT Filed: Apr. 30, 2015

(86) PCT No.: PCT/JP2015/062915
§ 371 (c)(1),
(2) Date: Oct. 27, 2016

(87) PCT Pub. No.: WO2015/174283
PCT Pub. Date: Nov. 19, 2015

(65) Prior Publication Data
US 2017/0054173 A1 Feb. 23, 2017

(30) Foreign Application Priority Data

May 14, 2014 (JP) ................................. 2014-100865

(51) Int. Cl.
*H01M 8/04082* (2016.01)
*H01M 8/04186* (2016.01)
(Continued)

(52) U.S. Cl.
CPC ............ *H01M 8/188* (2013.01); *H01M 8/02* (2013.01); *H01M 8/04* (2013.01);
(Continued)

(58) Field of Classification Search
CPC ............ H01M 8/18; H01M 8/02; H01M 8/04; H01M 8/04186; H01M 8/04201;
(Continued)

(56) References Cited

U.S. PATENT DOCUMENTS

2003/0022059 A1* 1/2003 Ito ....................... H01M 2/1288
429/71
2003/0173143 A1* 9/2003 West ....................... G01V 1/523
181/105

FOREIGN PATENT DOCUMENTS

CN 102244281 A 11/2011
JP 58-167093 U 11/1983
(Continued)

OTHER PUBLICATIONS

International Search Report in counterpart International Application No. PCT/JP2015/062915, dated Jul. 28, 2015.

*Primary Examiner* — Muhammad S Siddiquee
(74) *Attorney, Agent, or Firm* — Venable LLP; Michael A. Sartori; Laura G. Remus

(57) ABSTRACT

A redox flow battery includes a battery unit, a positive electrode electrolyte tank, a negative electrode electrolyte tank, and a pressure adjustment mechanism. The battery unit includes a positive electrode, a negative electrode, and a membrane. The positive electrode electrolyte tank stores a positive electrode electrolyte to be supplied to the battery unit. The negative electrode electrolyte tank stores a negative electrode electrolyte to be supplied to the battery unit. The pressure adjustment mechanism is attached to at least one of the electrolyte tanks and adjusts the pressure of a gas phase inside the electrolyte tank. The pressure adjustment mechanism is provided with a water sealed valve which includes a storage container that stores a pressure adjusting liquid, a first exhaust tube that extends from the gas phase inside the electrolyte tank, extends through a gas phase inside the storage container, and is open to a liquid phase inside the storage container, and a second exhaust tube whose one end is open to the gas phase inside the storage container and whose other end is open to the atmosphere.

(Continued)

The pressure adjusting liquid is a non-volatile liquid at normal temperature and normal pressure.

7 Claims, 4 Drawing Sheets

(51) Int. Cl.
  *H01M 8/04746* (2016.01)
  *H01M 8/18* (2006.01)
  *H01M 8/20* (2006.01)
  *H01M 8/02* (2016.01)
  *H01M 8/04* (2016.01)

(52) U.S. Cl.
  CPC ... *H01M 8/04186* (2013.01); *H01M 8/04201* (2013.01); *H01M 8/04753* (2013.01); *H01M 8/18* (2013.01); *H01M 8/20* (2013.01); *Y02E 60/528* (2013.01)

(58) Field of Classification Search
  CPC .... H01M 8/04753; H01M 8/188; H01M 8/20; Y02E 60/528
  See application file for complete search history.

(56) References Cited

FOREIGN PATENT DOCUMENTS

| | | |
|---|---|---|
| JP | S62-276762 A | 12/1987 |
| JP | 4-242586 A | 8/1992 |
| JP | 5-60583 U | 8/1993 |
| JP | 2001-048188 A | 2/2001 |
| JP | 2001-093560 A | 4/2001 |
| JP | 2001-253495 A | 9/2001 |
| JP | 2002-175825 A | 6/2002 |
| JP | 2007-311209 A | 11/2007 |

\* cited by examiner

REDOX FLOW BATTERY

TECHNICAL FIELD

The present invention relates to a redox flow battery which performs charging and discharging by circulating electrolytes through a battery unit.

BACKGROUND ART

Recently, in order to cope with global warming, power generation using natural energy (so-called renewable energy), such as solar power generation or wind power generation, has been actively conducted worldwide. The output of such power generation depends largely on natural conditions, such as weather. Accordingly, it is expected that when the percentage of natural energy used in electric power systems increases, problems may arise during the operation of electric power systems, such as difficulties in maintaining frequencies and voltages. As a countermeasure for such problems, it is considered to install large-capacity storage batteries so that smoothing of variations in output, storage of surplus electricity, leveling of loads, and the like can be achieved.

A redox flow battery shown in an operating principle diagram of FIG. 4 (hereinafter referred to as the RF battery β) is a large-capacity storage battery. The RF battery β, which is typically connected, through an AC/DC converter, between a power generation unit (such as a solar photovoltaic power generator, a wind power generator, or a general power plant) and a load (such as a consumer), charges and stores electricity generated by the power generation unit, or discharges and supplies stored electricity to the load.

The RF battery β includes a single or a plurality of battery units 100. A battery unit 100 includes a positive electrode cell 102 that contains a positive electrode 104, a negative electrode cell 103 that contains a negative electrode 105, a membrane 101 that separates the cells 102 and 103 and permeates ions, and performs charging and discharging. The positive electrode cell 102 is connected via ducts 108 and 110 to a positive electrode electrolyte tank 106 that stores a positive electrode electrolyte. The negative electrode cell 103 is connected via ducts 109 and 111 to a negative electrode electrolyte tank 107 that stores a negative electrode electrolyte. Furthermore, the ducts 108 and 109 are provided with pumps 112 and 113 that circulate their corresponding electrolytes, respectively. In the battery unit 100, the positive electrode electrolyte in the positive electrode tank 106 and the negative electrode electrolyte in the negative electrode tank 107 are circulated and supplied to the positive electrode cell 102 (positive electrode 104) and the negative electrode cell 103 (negative electrode 105), respectively, by ducts 108 to 111 and the pumps 112 and 113, and charging and discharging are performed in response to changes in the valence of metal ions (vanadium ions in the example shown) serving as active materials in the electrolytes at the two electrodes.

In the RF battery β, the gas phase inside each of the electrolyte tanks 106 and 107 expands or contracts when subjected to temperature changes in the installation environment, heat generation during charging and discharging, or the like. For example, when the pressure inside each of the electrolyte tanks 106 and 107 becomes a positive pressure greater than the atmospheric pressure, there is a concern that each of the electrolyte tanks 106 and 107 may explode. Furthermore, when the pressure inside each of the electrolyte tanks 106 and 107 becomes a negative pressure less than the atmospheric pressure, there is a concern that each of the electrolyte tanks 106 and 107 may be compressed and damaged. As a countermeasure for this problem, it has been proposed to provide a pressure adjustment mechanism on the redox flow battery, the pressure adjustment mechanism being configured to adjust the pressure inside each of the electrolyte tanks 106 and 107 to approximately the atmospheric pressure (for example, refer to PTL 1).

PTL 1 discloses a pressure adjustment mechanism including a first atmospheric pressure-maintaining container and a second atmospheric pressure-maintaining container in which a pressure adjusting liquid is stored (refer to FIG. 1 of PTL 1). The gas phase inside the first atmospheric pressure-maintaining container is made to communicate with the gas phase inside a liquid storage tank (electrolyte tank) by a first communicating means, and the liquid phase inside the first atmospheric pressure-maintaining container and the liquid phase inside the second atmospheric pressure-maintaining container are made to communicate with each other by a second communicating means. Furthermore, the gas phase inside the second atmospheric pressure-maintaining container is open to the atmosphere. In the pressure adjustment mechanism having such a configuration, when the pressure inside the electrolyte tank becomes positive, as shown in FIG. 2 of PTL 1, the liquid surface of the first atmospheric pressure-maintaining container falls, and the liquid surface of the second atmospheric pressure-maintaining container rises, thereby decreasing the pressure inside the electrolyte tank to approximately the atmospheric pressure. On the other hand, when the pressure inside the electrolyte tank becomes negative, as shown in FIG. 3 of PTL 1, the liquid surface of the first atmospheric pressure-maintaining container rises, and the liquid surface of the second atmospheric pressure-maintaining container falls, thereby increasing the pressure inside the electrolyte tank to approximately the atmospheric pressure.

Furthermore, in the configuration of PTL 1, when the pressure inside the electrolyte tank becomes negative, the atmosphere can be prevented from being sucked into the electrolyte tank, and it is possible to prevent degradation of the electrolyte due to the atmosphere. The atmosphere can be prevented from being sucked into the electrolyte tank because the second communicating means that connects the second atmospheric pressure-maintaining container and the first atmospheric pressure-maintaining container to each other is filled with the pressure adjusting liquid.

CITATION LIST

Patent Literature

PTL 1: Japanese Unexamined Patent Application Publication No. 2001-253495

SUMMARY OF INVENTION

Technical Problem

However, in the configuration of PTL 1, since the gas phase inside the second atmospheric pressure-maintaining container is open to the atmosphere, the pressure adjusting liquid inside the container evaporates. Accordingly, it is necessary to monitor the amount of the pressure adjusting liquid very frequently and to appropriately replenish the pressure adjusting liquid. Since maintenance during operation of such a redox low battery requires time and effort, it is desired to reduce the time and effort.

The present invention has been accomplished under these circumstances, and it is an object of the present invention to provide a redox flow battery in which the time and effort for maintenance during operation can be reduced.

Solution to Problem

A redox flow battery according to an embodiment of the present invention includes a battery unit, a positive electrode electrolyte tank, a negative electrode electrolyte tank, and a pressure adjustment mechanism. The battery unit includes a positive electrode, a negative electrode, and a membrane. The positive electrode electrolyte tank stores a positive electrode electrolyte to be supplied to the battery unit. The negative electrode electrolyte tank stores a negative electrode electrolyte to be supplied to the battery unit. The pressure adjustment mechanism is attached to at least one of the positive electrode electrolyte tank and the negative electrode electrolyte tank and adjusts the pressure of a gas phase inside the electrolyte tank. The pressure adjustment mechanism is provided with a water sealed valve which includes a storage container that stores a pressure adjusting liquid, a first exhaust tube that extends from the gas phase inside the electrolyte tank, extends through a gas phase inside the storage container, and is open to a liquid phase inside the storage container, and a second exhaust tube whose one end is open to the gas phase inside the storage container and whose other end is open to the atmosphere. The pressure adjusting liquid is a non-volatile liquid at normal temperature and normal pressure.

Advantageous Effects of Invention

In the redox flow battery, the time and effort for maintenance can be reduced.

DESCRIPTION OF EMBODIMENTS

Figure 1:
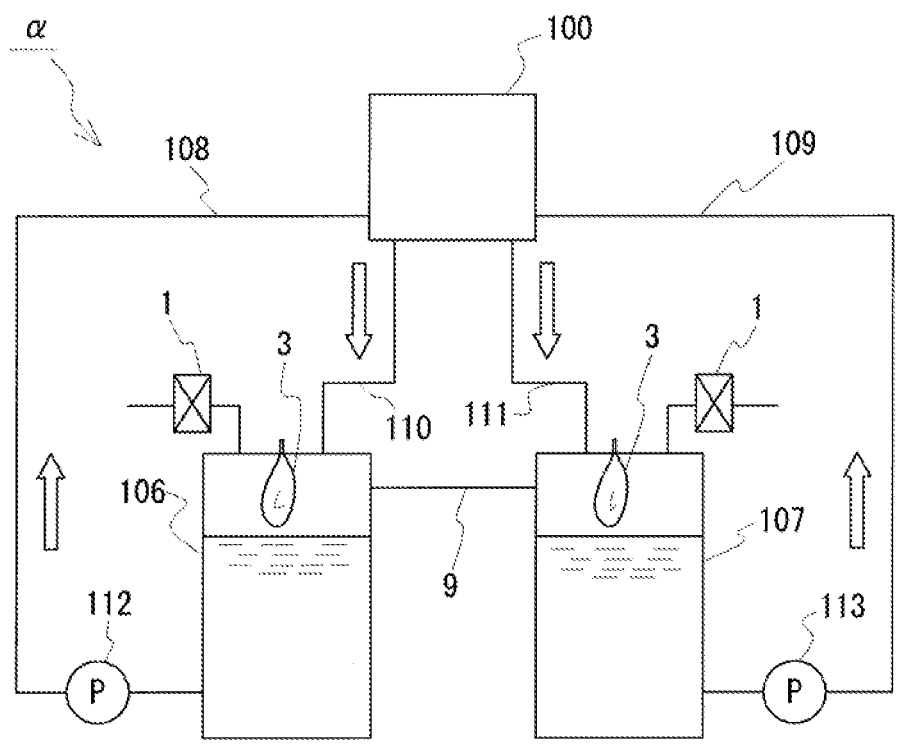
FIG. 1 is a schematic diagram of a redox flow battery according to an embodiment.

Description of Embodiments of the Present Invention

First, contents of embodiments of the present invention are enumerated and described.

[1] A redox flow battery according to an embodiment includes a battery unit, a positive electrode electrolyte tank, a negative electrode electrolyte tank, and a pressure adjustment mechanism. The battery unit includes a positive electrode, a negative electrode, and a membrane. The positive electrode electrolyte tank stores a positive electrode electrolyte to be supplied to the battery unit. The negative electrode electrolyte tank stores a negative electrode electrolyte to be supplied to the battery unit. The pressure adjustment mechanism is attached to at least one of the positive electrode electrolyte tank and the negative electrode electrolyte tank and adjusts the pressure of a gas phase inside the electrolyte tank. The pressure adjustment mechanism is provided with a water sealed valve which includes a storage container that stores a pressure adjusting liquid, a first exhaust tube that extends from the gas phase inside the electrolyte tank, extends through a gas phase inside the storage container, and is open to a liquid phase inside the storage container, and a second exhaust tube whose one end is open to the gas phase inside the storage container and whose other end is open to the atmosphere. The pressure adjusting liquid is a non-volatile liquid at normal temperature and normal pressure.

The water sealed valve provided in the pressure adjustment mechanism of the redox flow battery can discharge the gas inside the electrolyte tank to the atmosphere when the pressure inside the electrolyte tank becomes positive. The movement of the gas inside the electrolyte tank will be specifically described below. The gas inside the electrolyte tank passes through the first exhaust tube, is discharged into the liquid phase inside the storage container, and moves into the gas phase inside the storage container. The gas in the storage container is discharged through the second exhaust tube to the atmosphere. Consequently, the gas inside the electrolyte tank is discharged to the outside. Therefore, explosion of the electrolyte tank can be prevented. On the other hand, the water sealed valve also contributes to raising the pressure of the electrolyte tank when the pressure inside the electrolyte tank becomes negative. The reason for this is that, when the pressure inside the electrolyte tank becomes negative, the pressure adjusting liquid is sucked into the first exhaust tube, and the volume of the gas phase inside the first exhaust tube decreases by an amount corresponding to the amount of the pressure adjusting liquid sucked.

Furthermore, in the redox flow battery provided with the pressure adjustment mechanism, the time and effort for maintenance can be reduced. The reason for this is that the pressure adjusting liquid stored in the storage container of the water sealed valve is a non-volatile liquid at normal temperature and normal pressure and the volume of the pressure adjusting liquid hardly decreases.

[2] In the redox flow battery according to the embodiment, the specific gravity of the pressure adjusting liquid may be lower than the specific gravity of water, in this case, the water sealed valve further includes an overflow tube that is open on the side or bottom of the storage container and discharges to the outside dew condensation water accumulated on the lower side of the pressure adjusting liquid inside the storage container.

Since the gas phase inside the storage container contains a large amount of water vapor, when the temperature of the installation environment of the redox flow battery decreases, the water vapor inside the storage container condenses, and dew condensation water is accumulated on the lower side of the pressure adjusting liquid in the storage container. When dew condensation water excessively increases the liquid amount inside the storage container, the pressure value to be adjusted increases, or the pressure adjusting liquid overflows from the second exhaust tube and the water sealed valve fails to function, all of which are problems. By providing an overflow tube that discharges dew condensation water from the storage container, the amount of the liquid stored inside the storage container can be limited to a predetermined amount or less. Therefore, it is possible to prevent the problems described above.

[3] In the redox flow battery according to the embodiment, the specific gravity of the pressure adjusting liquid may be higher than the specific gravity of water. In this case, the water sealed valve further includes an overflow tube that is open on the side of the storage container and discharges to the outside dew condensation water accumulated on the upper side of the pressure adjusting liquid inside the storage container.

As has already been described above, dew condensation water is accumulated inside the storage container. Because of the specific gravity relationship, dew condensation water is accumulated on the upper side of the pressure adjusting liquid. When dew condensation water excessively increases the liquid amount inside the storage container, there is a concern that dew condensation: water may overflow from the second exhaust tube and the water sealed valve may fail to function. By providing an overflow tube that discharges dew condensation water from the storage container, the amount of the liquid inside the storage container can be limited to a predetermined amount or less. Therefore, it is possible to prevent the problems described above.

[4] In the redox flow battery according to the embodiment in which the specific gravity of the pressure adjusting liquid is higher than the specific gravity of water and dew condensation water is discharged from the upper side of the pressure adjusting liquid, the water sealed valve may further include a wave suppressing tube that houses the opening side portion of the first exhaust tube and has open ends. The opening on the lower side of the wave suppressing tube is located lower than the opening of the first exhaust tube, and the opening on the upper side of the wave suppressing tube is located higher than the liquid.

Since the opening on the lower side of the wave suppressing tube is located lower than the opening of the first exhaust tube, most of bubbles discharged from the electrolyte tank to the first exhaust tube enter the liquid phase inside the wave suppressing tube. Since the opening on the upper side of the wave suppressing tube is located higher than the liquid surface, the bubbles which have entered the liquid phase inside the wave suppressing tube burst open at the liquid surface inside the wave suppressing tube. Since the liquid surface inside the wave suppressing tube is divided by the wave suppressing tube from the liquid surface outside the wave suppressing tube, it is possible to suppress waving/bubbling on the liquid surface outside the wave suppressing tube. By suppressing waving/bubbling on the liquid surface inside the storage container in such a manner, it is possible to suppress mixing of dew condensation water and the pressure adjusting liquid in the vicinity of the liquid surface inside the storage container, and the pressure adjusting liquid can be prevented from being discharged from the overflow tube together with dew condensation water.

[5] In the redox flow battery according to the embodiment, the redox flow battery may include a breathing bag which is attached to at least on of the positive electrode electrolyte tank and the negative electrode electrolyte tank.

In the redox flow battery including the breathing bag, it is possible to effectively prevent the electrolyte tank from being compressed when the pressure inside the electrolyte tank becomes negative.

Detailed Description of Embodiments of the Present Invention

A redox flow battery according to the embodiment (hereinafter referred to as the RF battery α) will be described below with reference to the drawings. It is intended that the present invention is not limited to the examples shown below, but is determined by appended claims, and includes all modifications within the meaning and scope equivalent to those of the claims.

Embodiment 1

Figure 4:
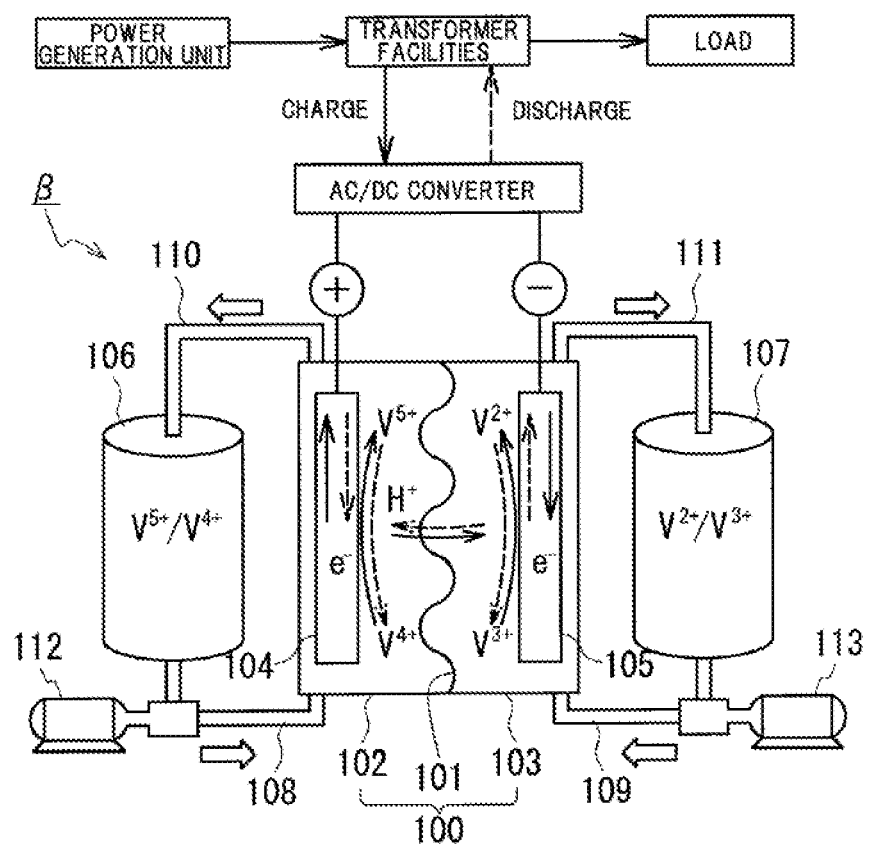
FIG. 4 is an operating principle diagram of a redox flow battery.

An RF battery α shown in FIG. 1 has the same configuration as that of the RF battery β described with reference to the operating principle diagram of FIG. 4 except that a gas phase communicating tube 9 and pressure adjustment mechanisms 1 are provided. Accordingly, components of the RF battery α shown in FIG. 1 that are common to those of the RF battery β shown in FIG. 4 are denoted by the same reference signs, and description thereof is omitted.

<<Overall Structure of RF Battery>>

The RF battery α shown in FIG. 1 includes a battery unit 100 and a circulation mechanism (electrolyte tanks 106 and 107, ducts 108 to 111, and pumps 112 and 113) configured to supply electrolytes to the battery unit 100, as in the existing RF battery β. However, the arrangement of the components of the RF battery α shown in FIG. 1 is close to the actual arrangement. For example, the electrolyte tanks 106 and 107 are arranged at lower positions than the battery unit 100.

The RF battery α includes the gas phase communicating tube 9 which connects the gas phase inside the positive electrode electrolyte tank 106 and the gas phase inside the negative electrode electrolyte tank 107 to each other. Because of the presence of the gas phase communicating tube 9, the gas phases inside the electrolyte tanks 106 and 107 can be treated as one body. A valve for maintenance may be provided in the middle of the gas phase communicating tube 9.

Furthermore, the RF battery α includes pressure adjustment mechanisms 1 attached to the electrolyte tanks 106 and 107 and breathing bags 3 attached to the electrolyte tanks 106 and 107. These members 1 and 3 are used to adjust the pressure inside each of the electrolyte tanks 106 and 107. The pressure adjustment mechanism 1 functions mainly when the pressure inside each of the electrolyte tanks 106 and 107 becomes positive, and the breathing bag 3 functions mainly when the pressure inside each of the electrolyte tanks 106 and 107 becomes negative.

<<Pressure Adjustment Mechanism>>

Figure 2:
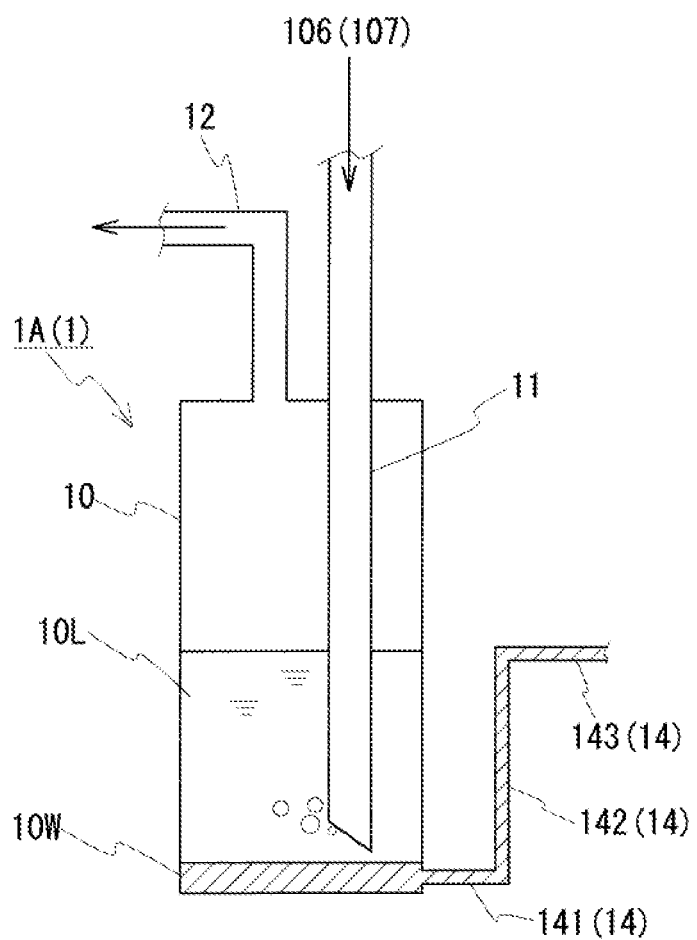
FIG. 2 is a schematic diagram of a pressure adjustment mechanism in Embodiment 1.

The pressure adjustment mechanism 1 is provided with a water sealed valve 1A as shown in FIG. 2. The reason for providing the pressure adjustment mechanism on each of the electrolyte tanks 106 and 107 is that, even when one pressure adjustment mechanism 1 fails, the other pressure adjustment mechanism 1 functions so that the pressure inside each of the electrolyte tanks 106 and 107 can be adjusted.

[Water Sealed Valve]

The water sealed valve 1A of the pressure adjustment mechanism 1 includes a storage container 10, a first exhaust tube 11, and a second exhaust tube 12. The storage container 10 is a member that stores a pressure adjusting liquid 10L. The first exhaust tube 11 is a member that extends from the gas phase inside the electrolyte tank 106 (107), extends through a gas phase inside the storage container 10, and is open to a liquid phase inside the storage container 10. The second exhaust tube 12 is a member whose one end is open to the gas phase inside the storage container 10 and whose other end is open to the atmosphere.

As the pressure adjusting liquid 10L, a liquid which is non-volatile at normal temperature and normal pressure and which has a lower specific gravity than water is used. Other properties required for the pressure adjusting liquid 10L include low hazardousness, a property of separating from water, and a non-freezing property. Examples of the pressure adjusting liquid. In that satisfies such properties include silicone oil and liquid paraffin. In particular, silicone oil has excellent heat resistance, cold resistance, and water resistance as well as a small change in viscosity over the wide temperature range, and therefore is preferable as the pressure adjusting liquid 10L. There are various types of silicone oil, which are classified by the number of side chains and the like, but the specific gravity thereof is generally lower than that of water. The amount of the pressure adjusting liquid 10L stored in the storage container 10 is preferably 0.1 liters (100 cm$^3$) to 5 liters.

The storage container 10, the first exhaust tube 11, and the second exhaust tube 12 each can be composed of a resin, such as polyvinyl chloride (PVC). Polyvinyl chloride is preferable because it has water resistance, acid resistance, alkali resistance, and solvent resistance and is inexpensive. The storage container 10 is preferably transparent so that the amount of the pressure adjusting liquid 10L in the storage container 10 can be checked from the outside. PVC can meet such a requirement. Of course, the first exhaust tube 11 and the second exhaust tube 12 may also be transparent.

The internal volume of the storage container 10 is preferably 0.5 to 10 liters. When the storage container 10 has an internal volume within this range, the function of the water sealed valve 1A can be sufficiently achieved.

The lower end position of the first exhaust tube 11 connected to the gas phase of the electrolyte tank 106 (107) is preferably set at a predetermined height so as not to reach the bottom of the storage container 10. The lower end position is preferably higher than the upper limit of the water level of dew condensation water 10W, which will be described later. This can avoid the problem that bubbling occurs in the dew condensation water 10W, which will be described later, and the pressure adjusting liquid 10L and the dew condensation water 10W are mixed violently. The inside diameter of the first exhaust tube 11 is preferably 1 to 10 cm. In the first exhaust tube 11 having an inside diameter within this range, the gas is smoothly discharged from the electrolyte tank 106 (107), and it is possible to avoid an excessive increase in the size of bubbles formed by the gas discharged from the first exhaust tube 11 into the liquid phase inside the storage container 10. When the size of bubbles increases excessively, there is a concern that the pressure adjusting liquid 10L and the dew condensation water 10W, which will be described later, may be mixed violently at the bottom of the storage container 10. Note that, in this example, the open end of the first exhaust tube 11 is obliquely cut so as to limit the discharge direction of bubbles from the first exhaust tube 11 to one direction.

The inside diameter of the second exhaust tube 12 is preferably 1 to 10 cm. The second exhaust tube 12 having an inside diameter within this range can rapidly discharge the gas in the storage container 10 to the outside.

The water seated valve 1A having the configuration described above has a function of adjusting the pressure inside the electrolyte tank 106 or 107 to approximately the atmospheric pressure when the pressure inside the electrolyte tank 106 or 107 becomes positive. Specifically, when the pressure inside the electrolyte tank 106 or 107 becomes positive, the gas inside the electrolyte tank 106 or 107 passes through the first exhaust tube 11 and is discharged into the liquid phase inside the storage container 10 (refer to the thick-line arrow). The gas discharged into the liquid phase, in the form of bubbles, rises in the liquid phase and moves into the gas phase inside the storage container 10. The gas in the storage container 10 is discharged through the second exhaust tube 12 to the atmosphere as indicated by the thick-line arrow. In such a manner, the gas inside the electrolyte tank 106 or 107 is discharged to the outside by the water sealed valve 1A, and the pressure inside the electrolyte tank 106 or 107 is adjusted to approximately the atmospheric pressure. As a result, explosion of the electrolyte tank 106 or 107 can be prevented.

The pressure adjusting liquid 10L in the water sealed valve 1A may be bubbled violently in some cases. However, since the pressure adjusting liquid 10L is composed of a non-volatile liquid at normal temperature and normal pressure, the volume of the pressure adjusting, liquid let in the storage container 10 hardly decreases. Therefore, it is possible to reduce the time and effort for monitoring the amount of the pressure adjusting liquid 10L and appropriately replenishing the pressure adjusting liquid 10L.

Furthermore, the water sealed valve 1A having the configuration described above also has a function of increasing the pressure inside the electrolyte tank 106 or 107 to approximately the atmospheric pressure when the pressure inside the electrolyte tank 106 or 107 becomes negative. When the pressure inside the electrolyte tank 106 or 107 becomes negative, the pressure adjusting liquid 10L is sucked into the first exhaust tube 11, and the volume of the gas phase inside the first exhaust tube 11 decreases by an amount corresponding to the amount of the pressure adjusting liquid 10L sucked. As a result, the pressure inside the electrolyte tank 106 or 107 increases, and compression of the electrolyte tank 106 or 107 can be suppressed.

Furthermore, the gas generated inside e electrolyte tank 106 or 107 may be a hazardous gas in some cases. Therefore, preferably, gas removal equipment is provided in the middle of the first exhaust tube 11 or the second exhaust tube 12. As the gas removal equipment, for example, that described in Japanese Unexamined Patent Application Publication No. 2007-311209 (e.g., a filter using copper oxide) may be used.

The water sealed valve 1A in this example further includes an overflow tube 14. The overflow tube 14 is a member that limits the liquid level of the pressure adjusting liquid 10L stored in the storage container 10 to a predetermined level or less. Since the gas phase inside the storage container 10 contains a large amount of water vapor, when the temperature of the installation environment of the redox flow battery α to FIG. 1) decreases, the water vapor inside the storage container 10 condenses, and dew condensation water 10W is accumulated on the lower side of the pressure adjusting liquid 10L in the storage container 10. When dew condensation water 10W excessively increases the liquid amount inside the storage container 10, there is a concern that the pressure value to be adjusted may increase, or the pressure adjusting liquid 10L may overflow from the second exhaust tube 12 and the water sealed valve 1A may fail to function, all of which are problems. By providing an overflow tube 14 that discharges dew condensation water 10W from the storage container 10, the amount of the liquid stored inside the storage container 10 can be limited to a predetermined amount or less. Therefore, it is possible to prevent the problems described above.

The overflow tube 14 includes a horizontal duct 141 that communicates with the side of the storage container 10 near the lower end in the height direction, a vertical duct 142 that extends upward in the vertical direction, and a horizontal duct 143 that is connected to the upper end of the vertical duct 142. By using such a configuration, when the liquid surface in the storage container 10 reaches the height of the upper horizontal duct 143, the dew condensation water 10W can be automatically discharged from the overflow tube 14. That is, the amount of the liquid inside the storage container 10 does not exceed the upper horizontal duct 143, and the liquid does not overflow from the storage container 10. Note that the overflow tube 14 may communicate with the bottom of the storage container 10.

<<Breathing Bag>>

As shown in FIG. 1, a breathing bag 3 is a member which is suspended in each of the electrolyte tank 106 and 107 and whose inside communicates with the atmosphere. As the breathing bag 3, a breathing bag having a known structure, for example, described in Japanese Unexamined Patent Application Publication No. 2002-175825 may be used.

When the pressure inside the electrolyte tank 106 or 107 becomes negative, the breathing bag 3 takes in the atmosphere to reduce the internal volume of the electrolyte tank 106 or 107 (excluding the breathing bag 3), thereby increasing the pressure inside the electrolyte tank 106 or 107. Furthermore, when the pressure inside the electrolyte tank 106 or 107 becomes positive, the breathing bag 3 also functions. Specifically, the gas inside the breathing bag 3 is discharged to the atmosphere to increase the internal volume of the electrolyte tank 106 or 107 (excluding the breathing bag 3), thereby decreasing the pressure inside the electrolyte tank 106 or 107.

<<Others>>

It is also possible to set up a backup mechanism in case the breathing bag 3 fails to operate by using the water sealed valve 1A described with reference to FIG. 2. In such a case, the second exhaust tube 12 of the water sealed valve 1A may be made to communicate with the gas phase inside the electrolyte lank 106 (107) and the first exhaust tube 11 may be made to communicate with the atmosphere. In such a configuration when the pressure inside the electrolyte tank 106 or 107 becomes negative and when the breathing bag 3 fails, the atmosphere is sucked from the first exhaust tube 11 and flows into the electrolyte tank 106 or 107 through the second exhaust tube 12. As a result the pressure inside the electrolyte tank 106 or 107 increases, and compression of the electrolyte tank 106 or 107 can be prevented. Since there is a concern that the electrolyte may be degraded by the atmosphere, this configuration is intended only as an emergency measure to cope with failure of the breathing bag 3.

Embodiment 2

In Embodiment 2, a configuration of a water sealed valve 1B in which a pressure adjusting liquid 10L having a higher specific gravity than water is used will be described with reference to FIG. 3.

Figure 3:
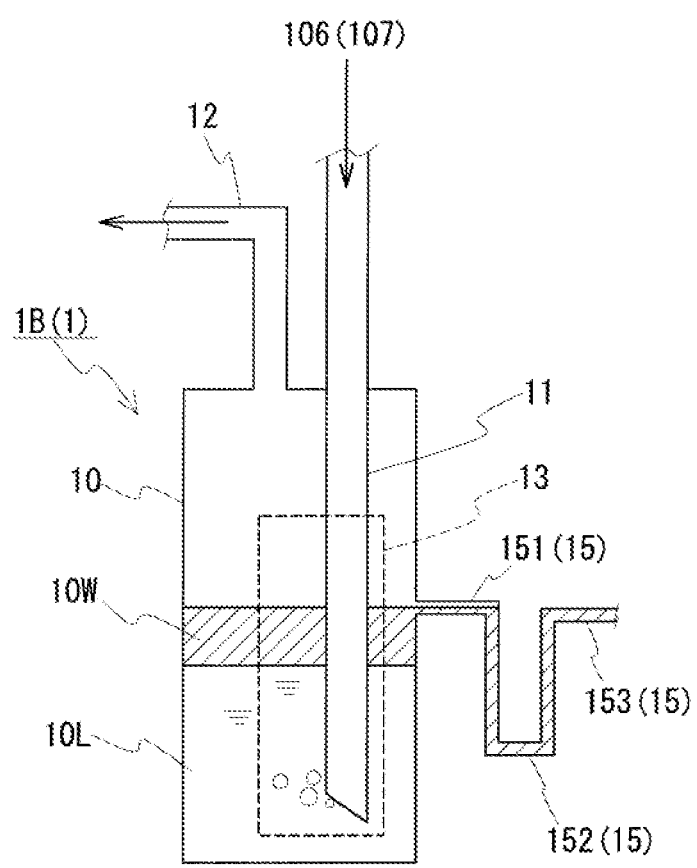
FIG. 3 is a schematic diagram of a pressure adjustment mechanism Embodiment 2.

The pressure adjusting liquid 10L used in the water sealed valve shown in FIG. 3 has a higher specific gravity than water. Other than this, properties required for the pressure adjusting liquid 10L in this example are the same as those of the pressure adjusting liquid 10L in Embodiment 1 (non-volatility and the like). Examples of the pressure adjusting liquid let that satisfies such properties include phosphate esters, chlorinated paraffin, and fluorinated oil.

In the case where the specific gravity of the pressure adjusting liquid 10L is higher than that of water, dew condensation water 10W is accumulated on the upper side of the pressure adjusting liquid 10L. Accordingly, in this embodiment, an overflow tube 15 is connected to the side of the storage container 10 in the middle portion in the height direction. The overflow tube 15 includes a U-shaped duct 152 and two horizontal ducts 151 and 153 placed on both ends thereof. The horizontal duct 153 on the right side of the U-shaped duct 152 is placed at a slightly lower position than the horizontal duct 151 on the left side (storage container 10 side) of the U-shaped duct 152. By using such a configuration, when the liquid surface in the storage container 10 reaches the height of the horizontal duct 153 an the right side, the dew condensation water 10W can be automatically discharged from the overflow tube 15 without discharging the gas inside the storage container 10. That is, the amount of the liquid inside the storage container 10 does not exceed the height of the horizontal duct 153 on the right side, and the liquid does not overflow from the storage container 10.

The water seated valve 1B in this example may further include a wave suppressing tube 13 (refer to the dashed line) inside the storage container 10. The wave suppressing tube 13 is a member that houses the opening side portion of the first exhaust tube 11 and suppresses waving on the liquid surface in the storage container 10 due to bubbles discharged from the first exhaust tithe 11. The wave suppressing tube 13 has open ends.

Since the opening on the lower side of the wave suppressing tube 13 is located lower than the opening of the first exhaust tube 11, most of bubbles discharged from the electrolyte tank 106 (107) to the first exhaust tube 11 enter the liquid phase inside the wave suppressing tube 13. Since the opening on the upper side of the wave suppressing tube 13 is located higher than the liquid surface, the bubbles which have entered the liquid phase inside the wave suppressing tube 13 burst open at the liquid surface inside the wave suppressing tube 13. Since the liquid surface inside the wave suppressing tube 13 is divided by the wave suppressing tube 13 from the liquid surface outside the wave suppressing tube 13, it is possible to suppress waving/bubbling on the liquid surface outside the wave suppressing tube 13. By suppressing waving/bubbling, on the liquid surface inside the storage container 10 in such a manner, it is possible to suppress mixing of dew condensation water 10W and the pressure adjusting liquid 10L in the vicinity of the liquid surface inside the storage container 10, and the pressure adjusting liquid 10L can be prevented from being discharged from the overflow tube 15 together with dew condensation water 10W.

INDUSTRIAL APPLICABILITY

The redox flow batteries according to the present invention can be suitably used as batteries for leveling load and as countermeasures for voltage sag/power failure.

REFERENCE SIGNS LIST

α a redox flow battery (RF battery α)
1 pressure adjustment mechanism
1A, 1B water sealed valve
10 storage container
11 first exhaust tube
12 second exhaust tube
13 wave suppressing tube
14 overflow tube
141, 143 horizontal duct
142 vertical duct
15 overflow tube
151, 153 horizontal duct
152 U-shaped duct
10L pressure adjusting liquid
10W dew condensation water
3 breathing hag
9 gas phase communicating tube
β redox flow battery (RF battery β)
100 battery unit
101 membrane 102 positive electrode cell
103 negative electrode cell
104 positive electrode
105 negative electrode
106 positive electrode electrolyte tank
107 negative electrode electrolyte tank
108 to 111 duct
112, 113 pump

The invention claimed is:

1. A redox flow battery comprising:
a battery unit which includes a positive electrode, a negative electrode, and a membrane;
a positive electrode electrolyte tank which stores a positive electrode electrolyte to be supplied to the battery unit;
a negative electrode electrolyte tank which stores a negative electrode electrolyte to be supplied to the battery unit; and
a pressure adjustment mechanism which is attached to at least one of the positive electrode electrolyte tank and the negative electrode electrolyte tank and adjusts the pressure of a gas phase inside the electrolyte tank,
wherein the pressure adjustment mechanism is provided with a water sealed valve which includes a storage container that stores a pressure adjusting liquid, a first exhaust tube that extends from the gas phase inside the electrolyte tank, extends through a gas phase inside the storage container, and is open to a liquid phase inside the storage container, and a second exhaust tube whose one end is open to the gas phase inside the storage container and whose other end is open to the atmosphere; and
the pressure adjusting liquid is a non-volatile liquid at normal temperature and normal pressure,
wherein the specific gravity of the pressure adjusting liquid is lower than the specific gravity of water; and
the water sealed valve further includes an overflow tube that is open on the side or bottom of the storage container and discharges to the outside dew condensation water accumulated on the lower side of the pressure adjusting liquid inside the storage container.

2. A redox flow battery comprising:
a battery unit which includes a positive electrode, a negative electrode, and a membrane;
a positive electrode electrolyte tank which stores a positive electrode electrolyte to be supplied to the battery unit;
a negative electrode electrolyte tank which stores a negative electrode electrolyte to be supplied to the battery unit; and
a pressure adjustment mechanism which is attached to at least one of the positive electrode electrolyte tank and the negative electrode electrolyte tank and adjusts the pressure of a gas phase inside the electrolyte tank,
wherein the pressure adjustment mechanism is provided with a water sealed valve which includes a storage container that stores a pressure adjusting liquid, a first exhaust tube that extends from the gas phase inside the electrolyte tank, extends through a gas phase inside the storage container, and is open to a liquid phase inside the storage container, and a second exhaust tube whose one end is open to the gas phase inside the storage container and whose other end is open to the atmosphere; and
the pressure adjusting liquid is a non-volatile liquid at normal temperature and normal pressure,
wherein the specific gravity of the pressure adjusting liquid is higher than the specific gravity of water; and
the water sealed valve further includes an overflow tube that is open on the side of the storage container and discharges to the outside dew condensation water accumulated on the upper side of the pressure adjusting liquid inside the storage container.

3. The redox flow battery according to claim 2,
wherein the water sealed valve further includes a wave suppressing tube that houses the opening side portion of the first exhaust tube and has open ends; and
the opening on the lower side of the wave suppressing tube is located lower than the opening of the first exhaust tube, and the opening on the upper side of the wave suppressing tube is located higher than the liquid surface.

4. The redox flow battery according to claim 1, further comprising a breathing bag which is attached to at least one of the positive electrode electrolyte tank and the negative electrode electrolyte tank.

5. The redox flow battery according to claim 2, further comprising a breathing bag which is attached to at least one of the positive electrode electrolyte tank and the negative electrode electrolyte tank.

6. The redox flow battery according to claim 1,
wherein the overflow tube includes a horizontal duct that communicates with a side of the storage container near a lower end in a height direction, a vertical duct that extends upward in a vertical direction, and a horizontal duct that is connected to an upper end of the vertical duct.

7. The redox flow battery according to claim 2,
wherein the overflow tube includes a U-shaped duct, and a right-side horizontal duct and a left-side horizontal duct that are connected to right-side and left-side ends of the U-shaped duct, respectively; and
the right-side horizontal duct is placed at a slightly lower position in a vertical direction than the left-side horizontal duct.

* * * * *